United States Patent [11] 3,613,058

[72] Inventors Peter I. Bonyhard
Newark;
Donald E. Kish, North Plainfield; James L. Smith, Somerset, all of N.J.
[21] Appl. No. 878,366
[22] Filed Nov. 20, 1969
[45] Patented Oct. 12, 1971
[73] Assignee Bell Telephone Laboratories, Incorporated
Murray Hill, Berkeley Heights, N.J.

[54] MAGNETIC DOMAIN PROPAGATION ARRANGEMENT
10 Claims, 3 Drawing Figs.

[52] U.S. Cl. .......... 340/174TF, 340/174 SR, 340/174 AC, 340/174 CC, 340/174 ZB
[51] Int. Cl. .......... G11c 21/00, G11c 11/14
[50] Field of Search .......... 340/174 TF, 174 SR

[56] References Cited
UNITED STATES PATENTS
3,516,077 6/1970 Bobeck et al. .......... 340/174

*Primary Examiner*—James W. Moffitt
*Attorneys*—R. J. Guenther and Kenneth B. Hamlin

ABSTRACT: Single wall domain propagation circuits include herein both magnetically soft overlays which define propagation paths along which domains move in response to reorienting in-plane fields and electrical conductors which act on magnetically hard regions in the overlay, when pulsed, to modify locally pole patterns generated by the in-plane fields. An organization in which domains are moved in a manner to eliminate unwanted effects of current pulses in those conductors on stored domain patterns is described.

INVENTORS: P.I. BONYHARD
D.E. KISH
J.L. SMITH
BY Herbert M. Shapiro
ATTORNEY

MAGNETIC DOMAIN PROPAGATION ARRANGEMENT

Field of the Invention

This invention relates to data processing apparatus and, more particularly, to such apparatus including magnetic material in which a single wall domain can be moved.

Background of the Invention

The term "single wall domain refers to a magnetic region encompassed by a single domain wall which closes on itself in the plane of the material in which the domain is moved. Inasmuch as a domain is self-contained in the plane of the material and does not intersect the edge of the material, it is free to move in that plane in response to consecutively offset fields. A domain of this type is described in the Bell System Technical Journal (BSTJ), Volume XLVI, No. 8, ( 1967 ) at page 1901.

The fields which move single wall domains are typically generated by pulses in series-connected conductor loop sets. The sets are pulsed in sequence to generate repetitive field patterns for moving information-representative domain patterns. Individual conductors can be pulsed also in a programmed manner to effect logic operations between selected domains. A conductor arrangement of this type requires a number of external connections which are, preferably, kept to a minimum.

An alternative implementation for generating the field patterns for moving domains employs magnetically soft overlay patterns which generate magnetic poles in response to fields in the plane of the material. Such an arrangement is disclosed in copending application Ser. No. 732,705, filed May 28, 1968, and now U.S. Pat. No. 3,534,347, for A. H. Bobeck. The in-plane field is reoriented causing movement of the poles and, consequently, movement of the domains which are attracted by them.

The path followed by the domains is determined by the geometry of the overlay and the consecutive orientations of the in-plane field. Typically, the overlay takes the form of bar and T-shaped patterns which repeat along an axis from input to output positions. The in-plane field is typically rotated to move domains along that axis. This implementation has the virtue that no external connections are necessary and packing densities are high; but selective movement of individual domains is difficult.

Practical application of single wall domain technology frequently dictates a hybrid arrangement which is a compromise between the two propagation techniques. For example, conductors may be used to alter locally the state of magnetization of some part of the overlay which may, conveniently, be made of magnetically hard material so that it is unaffected by the overall in-plane drive field. One such arrangement is described in copending application Ser. No. 878,411, filed Nov. 20, 1969, for J. L. Smith.

One requirement of such hybrid implementations is that pulses be applied in a manner to affect only designated domains without affecting others. The requirement is particularly acute when domains of small diameters as, for example, a few microns are being manipulated because the repeat of the overlay pattern is so small that desirably undisturbed domains are quite close to those to be manipulated. The corresponding overlay geometrics typically, have repeat patterns of three domain diameters or about three-tenths of a mil. It is difficult to isolate the influence of currents in wires when the dimensions are so small.

One object of this invention is to provide a new and novel hybrid domain propagation memory organization in which such currents do not deleteriously affect stored information.

BRIEF DESCRIPTION OF THE INVENTION

A memory in accordance with this invention includes word storage areas each comprising a primary and an auxiliary recirculating propagation channel. To be specific, magnetically soft permalloy overlays define an interconnected primary and auxiliary recirculating channel pair for each domain pattern representing a binary word. An in-plane field rotating in a first direction causes each word to move about only its primary channel; a field rotating in a second direction causes movement about the associated auxiliary channel as well. Selection conductors intersect only the portion of an associated auxiliary channel remote from the primary channel.

In operation, information is moved into an auxiliary channel only after a selected conductor is pulsed, thus virtually eliminating unwanted effects on domain patterns in the primary channels by fields generated by such pulses. The selection operation closes a switch for enabling a selected word to advance along a common propagation channel in response to the rotating in-plane field while all nonselected words recirculate in their storage areas.

A primary use of the recirculating channel memory in accordance with this invention is in an arrangement where domain patterns representing stored information are stored in primary channels to be gated to a common write-read area, an organization useful, for example, in telephone repertory dialers.

DETAILED DESCRIPTION

Figure 1:
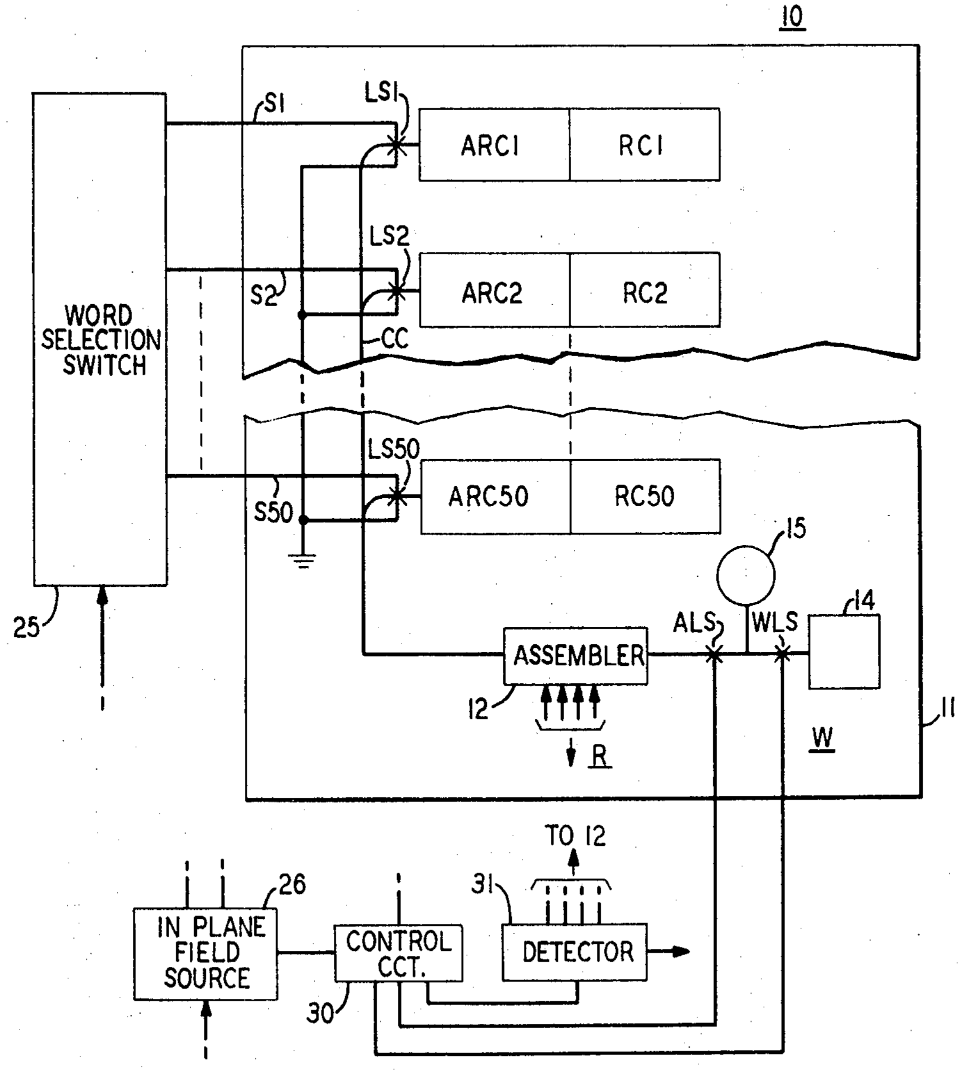
FIG. 1 is a diagram of a memory in accordance with this invention.

FIG. 1 shows a memory 10 in accordance with this invention. The memory comprises a sheet 11 of magnetic material in which single wall domains can be moved. A plurality of primary recirculating channels is defined by magnetically soft overlay patterns and represented by blocks, designated RC1–RC50, in FIG. 1. The overlay patterns are discussed in detail in connection with FIGS. 2 and 3.

Auxiliary recirculating channels are similarly defined and represented by blocks designated ARC1–ARC50 in FIG. 1. The auxiliary channels are connected to a common domain propagation channel, represented by line CC of FIG. 1, through latching switches LS1–LS50 as discussed in detail hereinafter.

The common channel leads to a write area, designated W, through a common recirculating channel 12 termed an assembler herein. Square 14 and circle 15 of area W represent magnetically soft discs which generate and annihilate domains respectively as is described further below.

A read area R is defined in assembler 12.

A discussion of the overall operation provides a context in which the details of the various aspects of the memory of FIG. 1 are most understandable. Accordingly, the overall operation is discussed first along with details of certain aspects of the implementation followed by a description of the storage and reading operation.

Figure 2:
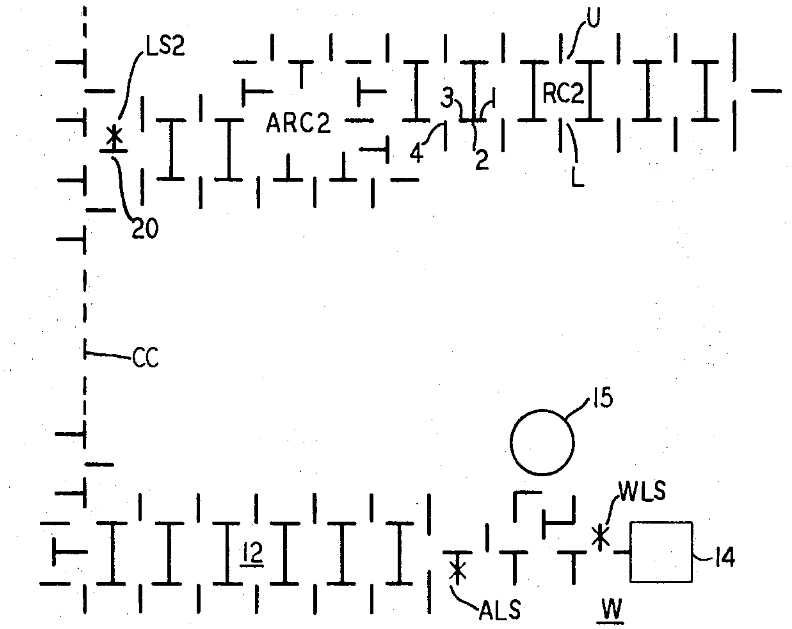
FIG. 2 is a top view of an overlay geometry for a representative channel arrangement and write-read portion of the memory of FIG. 1.
Figure 3:
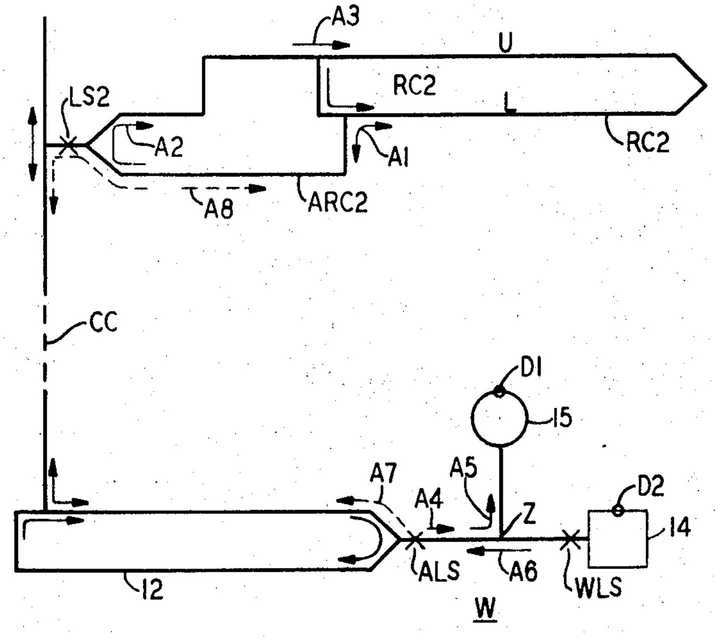
FIG. 3 is a diagram of the arrangement of FIG. 2.

Virtually the entire arrangement of FIG. 1 comprises a magnetically soft overlay of a configuration shown in detail in FIG. 2 and in line diagram form in FIG. 3 for a representative portion thereof. The overlays can be seen to comprise bar and T-shaped overlay elements arranged in a pattern to respond to a rotating in-plane field as described in the above-mentioned copending application of A. H. Bobeck. Typically, these overlays comprise magnetically soft permalloy formed on glass by photolithographic techniques and juxtaposed with sheet 11. Magnetic poles appear in changing patterns in the overlays in response to the rotating in-plane field. We will assume, for illustration, that the field rotates clockwise or counterclockwise and consider briefly the movement of a domain in a representative channel RC2. It has already been established, in the above-mentioned Bobeck application that domain patterns representative of information can be moved by such circuits. A discussion in terms of only a representative domain here simplifies the description without a loss of understanding accordingly.

The representative domain moves to the left along a lower path L of primary channel RC2 of FIG. 2 through the auxiliary channel and right along the upper channel U as the in-plane field rotates clockwise. Consecutive positions for a domain are designated 1, 2, 3, and 4 in FIG. 2 for a single cycle of the in-plane field. Next adjacent domains would occupy like positions with respect to next adjacent repeat patterns of the overlay. A domain, on the other hand, moves to the right (viz, positions 4, 3, 2, and 1) in the lower path and to the left in the upper path of the primary channel alone when the field rotates counterclockwise. In the latter instance, a domain does not enter the auxiliary channel ARC2, the primary channel functioning as a recirculating word storage area for a domain pattern.

Memory operation, in general, requires the capability of storing a selected domain pattern and reading out a selected pattern so stored. Such operation is controlled by the state of the latching switches indicated by the X marks in FIGS. 1, 2, and 3. Each of these switches comprises a T-shaped layer of magnetically soft permalloy having a stem and top section. The stem includes, in addition a layer of a magnetic material sufficiently hard magnetically to be unaffected by the in-plane field. A conductor couples the stem and the polarity of a current applied to that conductor determines the direction of magnetization of the hard material.

When the hard material is magnetized in one direction, the center position of the top section of the T-shaped overlay is inhibited from accumulating magnetic poles as the in-plane field rotates into alignment therewith. A domain being moved by those poles is forced to follow an alternative propagation channel.

Such a switch, and its operation, is disclosed in detail in he above-mentioned copending application of J. L. Smith Suffice it to say at this juncture that he switch operates to inhibit the accumulation of magnetic poles at specific positions along propagation channels and consequently inhibits the passage of domains along a channel so inhibited. The inhibit condition is referred to herein as the "open" state for the switch. Domains thus pass such a switch when the switch is in a "closed" state.

In the context of this background, the writing of information (a domain pattern) into a representative primary recirculating channel RC2 of FIGS. 2 and 3 requires that latching switches ALS and LS2 be closed and that the in-plane field be activated for moving domain patterns clockwise in channel RC2 and ARC2 through the position of latching switch LS2 to initiate the clearance of any previously stored information there. To this end, the latching switch, as for example switches LS*i* of FIG. 1 (where *i* is a dummy variable), has associated conductors S1–S50 connected between a word selection switch 25 and ground for individual selection.

This operation may be visualized in terms of a repertory dialer as initiated by an off-hook current which starts the in-plane field. The depression of a write button and number select button on a telephone subset (not shown) closes switches ALS and LS2 for this illustrative operation.

Block 26 of FIG. 1 represents the source of the in-plane field.

Only information in the selected word storage area (recirculating channel RC2) is passed to the common channel CC of FIG. 3. All stored information (both selected and nonselected in every recirculating channel, of course, moves clockwise along the outer path indicated by the arrows A1, A2, and A3 in FIG. 3. But only the latching switch LS2 is closed. Accordingly, information in all nonselected channels recirculates and only information in channel RC2 passes to the common channel CC.

Information from the selected recirculating channel moves downward along the common channel as the in-plane field continues to rotate. All nonselected information continues to recirculate clockwise in the storage areas as indicated in FIG. 3.

The selected information moves to the right along the top channel of the assembler 12 of FIG. 2 and passes into the write portion W of FIG. 1. It is recalled that switch ALS is closed for the write operation and information passes through the position of the switch. The geometry of the overlay (see FIG. 2) in the write area is such that all information (domain patterns) moving to the right as viewed in FIG. 3 moves to disc 15 as indicated by the arrows A4 and A5 in that figure.

All domains which arrive at disc 15 are annihilated. Disc 15 typically has a domain, D1 in FIG. 3 moving about its periphery as the in-plane field rotates. This domain is always in a position at which an approaching domain contacts the disc and acts to absorb the approaching domain. The write operation requires the annihilation of information previously stored in the storage area into which new information is to be stored. Such annihilation is accomplished in this manner as continued rotation of the in-plane field occurs. The maximum number of consecutive positions through which information is moved between its normal storage area to disc 15 is known (viz, the number of pattern repeats in the overlay). Consequently, the maximum number of in-plane field rotations to realize complete annihilation of stored information is known Control circuit 30 of FIG. 1 is considered to include timing or counting circuitry for this purpose.

At this juncture in the operation, the selected channel is cleared of information and readied for new information. Control circuit 30 now operates to reverse the direction of rotation of the in-plane field and opens switch WLS of FIG. 1.

The actual writing of information is now initiated. Specifically, block 14 of FIG. 1 includes a domain D2 which moves about the periphery of the magnetically soft overlay represented by that block. The domain gives rise to a domain for propagation when the in-plane field in a proper orientation is appropriately augmented as disclosed in copending application Ser. No. 756,210 filed Aug. 29, 1968 and now U.S. Pat. No. 3,555,527 for A. V. Perneski, thus forming domain patterns for propagation.

Such an input arrangement is adapted, in accordance with this invention, to keep written information remote from pulsed conductors in the arrangement of FIG. 1 by selectively annihilating ones of a consecutive stream of domains generated at 14. Annihilation is accomplished without the use of current pulses by moving selected domains to 15.

This operation entails controlled reversals of the in-plane field. First, the in-plane field rotates to advance domains from 14 through intersection Z of FIG. 3. A reversal of the field at a time when a selected domain passes Z moves that domain to 15 for annihilation; another reversal moves an absent domain into the domain (data) stream. If it is desired to write a binary one rather than a binary zero, no such reversals of the in-plane field are necessary. When switch WLS is closed, domain patterns generated at 14 move to the left, as represented by arrows A6 and A7 in FIG. 3, through switch ALS into the upper channel of assembler 12. Information stored in this manner is moved to a selected storage area (i.e., primary channel RC2) before switches ALS and WLS are pulsed open. Consequently, the information is not disturbed by the switching pulses.

If the input domain pattern is responsive to a telephone pushbutton input, for example, the depression of a button results in a (binary) coded domain pattern which is advanced immediately by rotating the in-plane field a preset number of times to clear the write portion for a next decimal representation. Consecutive patterns are written in on this basis in response to the depression of next consecutive buttons (not shown) until an entire telephone number code is stored. The information advances during this operation into the top channel of the assembler.

A telephone number requires up to 64 bits, four for each decimal representation. Both the assembler and each primary recirculating channel, in this instance, are taken to include a sufficient number of overlay repetitions to accommodate such a number of bits. Moreover, each stored set of representations may be preceded by a "start-of-number" indication useful in readout operations as will become clear. The number of overlay repetitions is designed to accommodate such a code also.

The overall operation of a repertory dialer to which a memory in accordance with this invention may be adapted as well as the implementing logic circuitry for that operation is disclosed in copending application Ser. No. 685,143, filed Nov. 22, 1967 and now U.S. Pat. No. 3,508,225 for J. L. Smith and Ser. No. 554,378, filed June 1, 1966 and now U.S. Pat. No. 3,482,224, for U. F. Gianola, R. A. Kaenel, and J. L. Smith, and is not described in detail herein.

The suitability of a memory organization in accordance with this invention in such a dialer is established by the selective writing of single wall domain patterns into a selected recirculating channel. Accordingly, the provision of consecutive domain patterns at W is followed by, for example, an on-hook signal which causes the in-plane field to rotate a sufficient number of times to advance information, written as described, upwards into the common channel. Each switch encountered by the information as it advances presents a preferred path for information so advancing. But only switch LS2 is closed. Consequently, the information advances through switch LS2 to the right, as indicated by arrow A8 of FIG. 3, along the lower channel of auxiliary channel ARC2 and primary channel RC2 to circulate counterclockwise as the in-plane field continues to rotate.

Further counterclockwise rotations continue to recirculate the information counterclockwise in only the primary channel as discussed hereinbefore. All nonselected information, of course, already is moving counterclockwise only in respective primary channels. Consequently, all stored information occupies primary recirculating channels remote from switches LS*i*.

After a preset time to allow return of all information to the selected channel, control circuit 30 of FIG. 1 resets all switches and terminates the in-plane field. Only switch LS2 of the channel select switches was in a closed state and, consequently, only that switch is reset opened in response. The write operation is now complete.

It is clear that the switching pulses are applied only when information is in remote storage areas. Consequently, our object is realized.

The read operation is directed at reading the information stored in a selected storage area. Operation is initiated with the closing of a selection switch LS*i* of FIG. 1 and the initiation of clockwise rotations of the in-plane field as was the case in the write operation. In this instance, however, switch ALS is not closed. The information stored in a selected storage area moves exactly as described before along the common channel into the assembler for recirculation. It can be seen from the overlay geometry that clockwise rotating in-plane fields cause information to recirculate clockwise in the assembler as well as in the primary channels. Control circuit 30 of FIG. 1 functions to enable detector 31 of FIG. 1 after a preset number of in-plane field rotations to insure that the most remote information has adequate time to enter the assembler.

Detector 31 recognizes the start-of-number code. When the code is recognized, control circuit 30 reverses the direction of rotation of the in-plane field for moving domains through the readout position to provide coded outputs indicative of consecutive domain patterns. In the context of a repertory dialer, the domain patterns are in the form of four consecutive binary digits representing a decimal digit code for transmission to a telephone central office. For such operation, control circuit 30 would be adapted to reduce the rate of rotation of the in-plane field to be compatible with the rate at which dial pulses are received at a central office.

The actual detection of domain patterns is realized, conveniently, by Hall probes (not shown) which respond to the passage of domain patterns to generate pulses for detection under the control of the control circuit.

At the termination of the read operation, control circuit 31 terminates the in-plane field. Thereafter, in response to a signal which may be an on-hook signal, the in-plane field is rotated counterclockwise and the information in the assembler is returned to its storage area in the manner described.

It is important to note that the consecutive bits of information stored in a selected recirculating channel need not appear consecutively when moved into the primary recirculating channel or into the assembler. Actually, a scrambling of bits may occur when the in-plane field is reversed during operation. As long as a start-of-number code is present, this scrambling is self-correcting.

A repertory dialer including a memory in accordance with this invention is implemented on a slice of, for example, samarium terbium orthoferrite having dimensions of about seven-tenths by 1 inch. The overlay is structured to move 3/10th-mil diameter domains on 12-mil centers and is about 5,000 angstrom units thick. A 16-oersted field in-plane field is used with about a 50-oersted bias field (means not shown).

What has been described is considered only illustrative of the principles of this invention. Therefore, other and varied modification can be devised by one skilled in the art in accordance with those principles within the spirit and scope of this invention.

What is claimed is:

1. A domain propagation memory comprising a material in which single wall domains can be moved and an overlay for defining a pair of first and second interlocking recirculating channels in said materials, said overlay also defining a propagation channel extending from said second channel of said pair at a point remote from said first channel of means pair, means for selectively inhibiting the passage of domains between said second and said propagation channels, said overlay being of a geometry for circulating domains in a first direction about only said first channel of said pair in response to an in-plane field reorienting in a first manner and for circulating domains in a second direction about both said first and said second recirculating channels in response to an in-plane field reorienting in a second manner, and means for selectively providing an in-plane field reorienting in said first or said second manner.

2. A memory in accordance with claim 1 wherein said overlay comprises magnetically soft bar and T-shaped overlay elements and said in-plane field reorients by rotation clockwise and counterclockwise.

3. A memory in accordance with claim 2 wherein said means for inhibiting comprises magnetic material sufficiently hard magnetically to be unaffected by said in-plane field, and a conductor for switching said last-mentioned material to a condition to inhibit the passage of a domain through said point in said second channel from which said propagation channel extends.

4. A memory in accordance with claim 3 also including means for selectively detecting the presence of domains in said propagation channel, means for selectively annihilating domains in said propagation channel, and means for selectively providing domains in said propagation channel.

5. A memory in accordance with claim 4 wherein said means for selectively providing domains includes means for reorienting said in-plane field in a first manner, said overlay defining said propagation channel and said second channel being of a geometry to move domain patterns therethrough for recirculation in said first direction in said first channel in response thereto.

6. A memory in accordance with claim 2 including a plurality of said recirculating channel pairs, a means for inhibiting associated with each of said second channels, and means for selectively activating said means for inhibiting to allow passage of domains.

7. A domain propagation memory comprising a material in which single wall domains can be moved, a magnetically soft overlay of a geometry for defining a plurality of domain propagation channels in said material, means for selectively providing an in-plane field in first and second consecutive orientation sets for moving domain patterns in first and second directions in said channels respectively, means including electrical conductors for selectively providing magnetic fields in localized positions in said channels, said overlays having geometries to define in each of said channels a recirculating channel remote from the associated one of said localized positions in which domain patterns are recirculated when said in-plane field follows said first consecutive orientation set and to move domain patterns to said localized positions when said in-plane field follows said second consecutive orientation set.

8. A memory in accordance with claim 7 wherein each of said localized positions includes magnetic material sufficiently hard magnetically to be unaffected by said in-plane field, and means for selectively switching said last-mentioned material to a condition to inhibit the passage of domains, said overlay having a geometry to define channels from said localized positions to associated ones of said remote channels for the recirculation of domains denied passage at said positions.

9. A memory in accordance with claim 8 wherein said overlay also defines a common domain propagation channel for domains passed at a selected one of said localized positions.

10. A memory in accordance with claim 9 also including means for introducing domains selectively to said common channel, and means for detecting the presence of domains in said common channel.